(12) United States Patent
Belsak, Jr.

(10) Patent No.: US 6,993,317 B2
(45) Date of Patent: Jan. 31, 2006

(54) METHOD AND SYSTEM FOR SIGNAL REPEATING IN POWERLINE COMMUNICATIONS

(75) Inventor: Frederick C. Belsak, Jr., Newton, NH (US)

(73) Assignee: Amperion, Inc., Andover, MA (US)

( * ) Notice: Subject to any disclaimer, the term of this patent is extended or adjusted under 35 U.S.C. 154(b) by 458 days.

(21) Appl. No.: 10/264,160

(22) Filed: Oct. 2, 2002

(65) Prior Publication Data

US 2004/0067745 A1    Apr. 8, 2004

(51) Int. Cl.
  *H04M 9/00* (2006.01)
(52) U.S. Cl. ............ 455/402; 340/310.03; 340/310.04; 340/310.06; 340/10.02; 370/441; 455/422.1; 361/64
(58) Field of Classification Search .......... 340/310.03, 340/310.04, 310.01, 310.06, 10.02; 370/441; 361/64; 324/125; 225/29; 385/15, 24; 455/422.1
See application file for complete search history.

(56) References Cited

U.S. PATENT DOCUMENTS

| | | | | |
|---|---|---|---|---|
| 4,142,178 A | * | 2/1979 | Whyte et al. .......... 340/310.06 |
| 4,471,399 A | | 9/1984 | Udren .......................... 361/64 |
| 5,319,634 A | | 6/1994 | Bartholomew et al. ....... 370/18 |
| 5,497,142 A | | 3/1996 | Chaffanjon ............ 340/310.06 |
| 5,625,863 A | * | 4/1997 | Abraham ..................... 725/79 |
| 5,644,573 A | * | 7/1997 | Bingham et al. ........... 370/503 |
| 5,684,450 A | * | 11/1997 | Brown .................. 340/310.02 |
| 5,699,276 A | * | 12/1997 | Roos ...................... 379/106.03 |
| 5,717,685 A | | 2/1998 | Abraham ..................... 370/30 |
| 5,729,370 A | * | 3/1998 | Bernstein et al. ............ 398/66 |
| 5,774,500 A | * | 6/1998 | Zogakis et al. ............ 375/261 |
| 5,777,769 A | * | 7/1998 | Coutinho .................... 398/171 |
| 5,828,293 A | * | 10/1998 | Rickard ................ 340/310.04 |
| 5,835,321 A | * | 11/1998 | Elms et al. .................... 361/45 |
| 5,864,284 A | | 1/1999 | Sanderson ............ 340/310.01 |
| 5,937,342 A | | 8/1999 | Kline ........................ 455/402 |
| 5,982,276 A | | 11/1999 | Stewart ................ 340/310.01 |
| 6,243,571 B1 | | 6/2001 | Bullock et al. ............. 455/402 |
| 6,282,405 B1 | | 8/2001 | Brown ....................... 455/6.1 |
| 6,317,031 B1 | * | 11/2001 | Rickard ................ 340/310.03 |
| 6,452,482 B1 | | 9/2002 | Cern ...................... 340/310.01 |
| 6,756,776 B2 | | 6/2004 | Perkinson et al. .......... 324/127 |
| 2002/0002040 A1 | | 1/2002 | Kline et al. ............... 455/402 |
| 2002/0097953 A1 | | 7/2002 | Kline .......................... 385/24 |
| 2002/0110310 A1 | | 8/2002 | Kline .......................... 385/15 |

\* cited by examiner

*Primary Examiner*—Temika Beamer
*Assistant Examiner*—David Q. Nguyen
(74) *Attorney, Agent, or Firm*—Ware, Fressola, Van Der Sluys & Adolphson LLP (57) ABSTRACT

A method and system for enhancing communication signals in a power-line communications system, which uses high-voltage or medium-voltage power lines as a transmission medium. Because communication signals are subject to attenuation as they traverse the power-lines over a long distance, they are repeated and amplified by repeaters along the power-lines. The repeated signals are caused to interfere among themselves because of the delay and overlap of signals. By optically or wirelessly conveying communication signals between two phase-lines, and repeating signals in a phase-line hopping fashion, the distance between two adjacent repeaters on any one phase-line can be significantly extended in order to reduce interference.

19 Claims, 9 Drawing Sheets

METHOD AND SYSTEM FOR SIGNAL REPEATING IN POWERLINE COMMUNICATIONS

FIELD OF THE INVENTION

The present invention relates generally to the use of radio frequencies for transmitting signals on a power line and, more particularly, to broadband communications using a power line as a transmission medium.

BACKGROUND OF THE INVENTION

In power-line communications (PLC), utility power lines, especially the high-voltage (HV, 60 kVAC and up) and medium-voltage (MV, 4–35 kVAC) power lines, are used as a transmission medium. The MV power lines are generally used to power the primaries of distribution transformers feeding electric power to homes and businesses. It is advantageous to convey communication signals in radio frequencies (RF).

Figure 1:
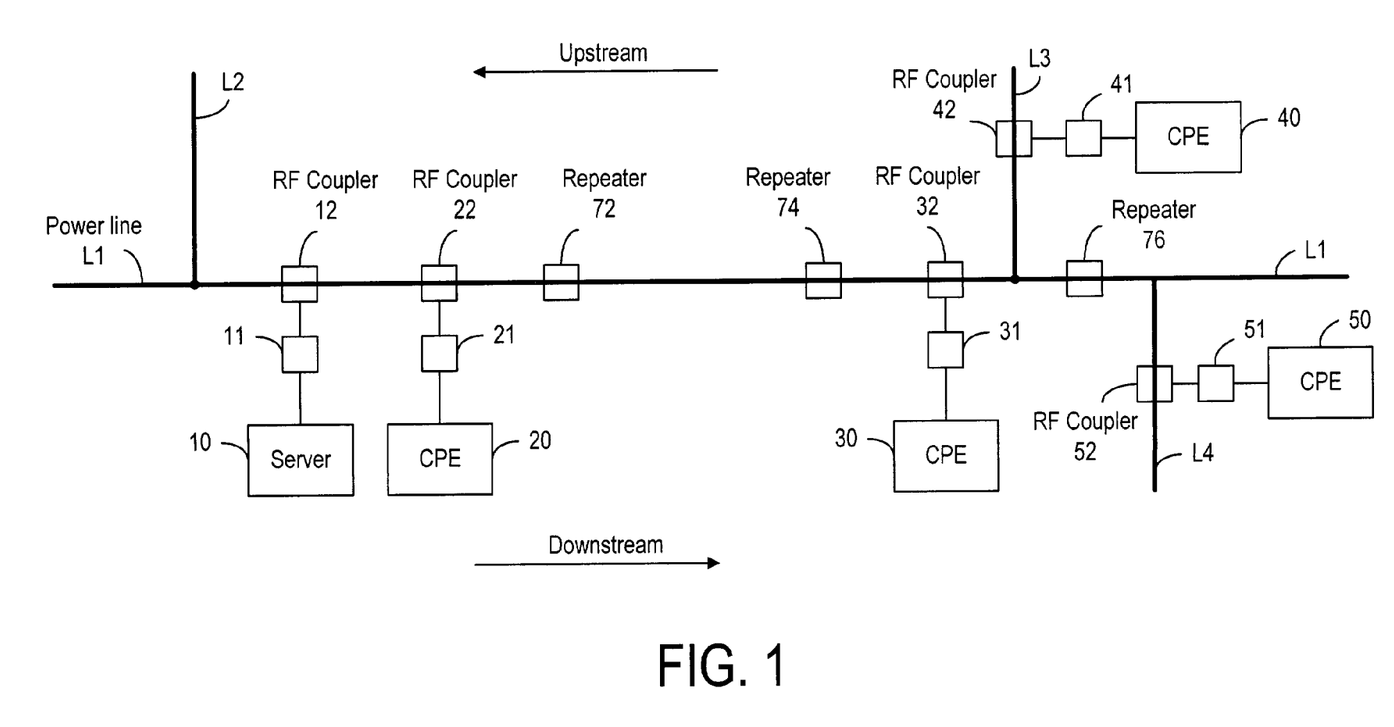
FIG. 1 is a schematic representation showing a power line communications network.

A typical scenario in PLC is shown in FIG. 1. As shown, a main power line L1 and a number of other power lines L2, L3, L4 branching off from L1 are used to carry the RF communication signals. A server 10 is used at a distribution center to receive multimedia information from service providers and to send the information to a plurality of customers downstream. The server 10 uses an RF coupler 12 and an associated distribution modem 11 to broadcast the RF communication signals on power line L1 so that customers can receive the signals using their customer premise equipment (CPE). For example, CPE 20 and CPE 30 acquire the RF signals from L1 via RF couplers 22, 32 and associated modems 21, 31, while CPE 40 acquires the RF signals from L3 via an RF coupler 42 and an associated modem 41, and so on. On the upstream direction, customers can use their CPE to send request data to the server via the same couplers and modems.

It is known that RF signals are attenuated considerably as they are transmitted along the power line. As a result, a CPE located too far from the server 10 may not be able to receive usable RF signals. For example, while CPE 20 may be able to receive good signals from the server 10, CPEs 30, 40 and 50 may not. Thus, it is necessary to provide a plurality of repeaters 72, 74, etc. along the power lines to make it possible for CPE 30, 40 and 50 to receive the communication signals.

It should be noted that although a connection is shown from, for instance, server 10 to distribution modem 11, this connection may be via a wireless radio frequency link, e.g., according to IEEE specification 802.11x (where x=a, b, c, . . . , etc) or via a fiber optic link, etc. Such connections and methods can also be used from each of the CPEs 20, 30, 40, 50, etc. and their corresponding modems 21, 31, 41, 51, etc.

Similarly the connection from distribution modem 11 and RF coupler 12 and from each modem 21, 31, 41, 51, etc. to corresponding RF couplers 22, 32, 42, 52, etc. can be electrical (voltaic), optical or wireless.

In general, it is desirable that any server or CPE not have any physical connection (voltaic or optical fiber) to its corresponding modem if the corresponding modem is voltaically connected to its corresponding RF coupler. This general design goal is to eliminate any possible failure mode where MV voltages can be brought in contact with CPEs or servers.

Figure 2:
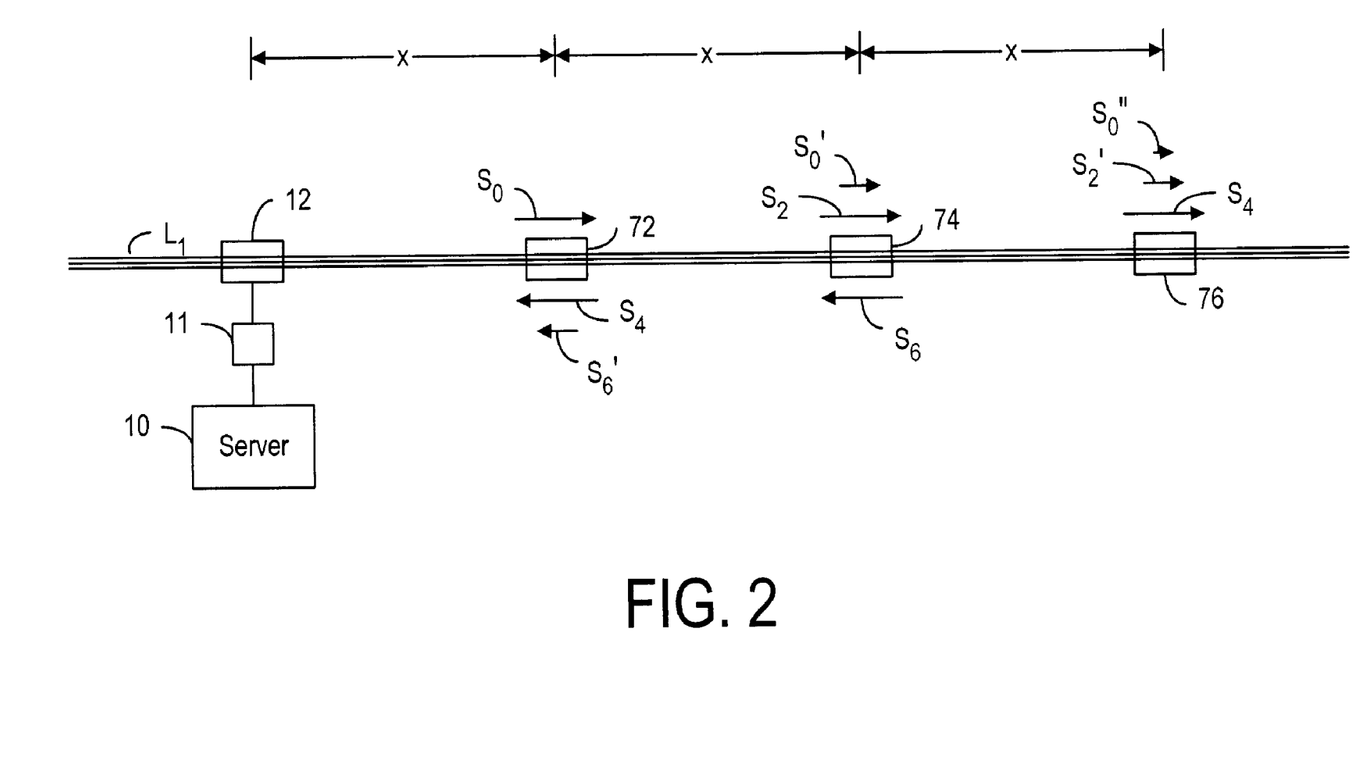
FIG. 2 is a schematic representation showing a plurality of repeaters being used along a power line for repeating communication signals causing interference in the signals.

When a repeater receives communication signals conveyed from the upstream direction via a power line, it is designed to repeat the communication signals so that the CPE in the downstream can receive useful RF signals. These repeated signals will also travel upstream along the same power line. When there are many repeaters along the same power line repeating the same communication signals, there will be significant interference among the repeated signals because of the delay in each repeater and the overlap of signals. In general, a repeater is needed at a location when the communication signals have been attenuated significantly but are still useful. For example, the distance X between two adjacent repeaters can be the length of the power line segment such that the amplitude or the strength of the signals has reduced to 1/e after the signals traverse such length. As shown in FIG. 2, three repeaters 72, 74 and 76 are implemented on the power line $L_1$ for RF signal repeating. As shown, repeater 72 receives RF signal $S_0$ from Server 10 via RF coupler 12 and transmits RF signal $S_2$. Similarly, repeater 74 receives signals $S_2$ and transmits signal $S_4$. Assuming that the signal strength of the signals transmitted by RF coupler 12 and the signal strength of all repeaters is substantially the same, then the signal $S_0$, as received by repeater 72, is substantially the same as the signal $S_4$ as received by repeater 72. Additionally, repeater 72 also receives signal $S_6'$ transmitted upstream by repeater 76. Because signal $S_6'$ has traveled an additional distance X, its strength is smaller than either $S_0$ or $S_4$ by a factor of (1/e). Thus, interference on the received signal $S_0$ at repeater 72 mainly results from the upstream signal $S_4$.

It would be advantageous and desirable to provide a method of RF signal repeating wherein interference in the repeated signals is greatly reduced.

SUMMARY OF THE INVENTION

It is a primary object of the present invention to reduce interference in the repeated RF signals in a communications system that uses power lines as a communication pathway. This object can be achieved by using two or more conductors running along side the communication pathway and implementing repeaters in different conductors so that the distance between adjacent repeaters on any one conductor is greatly extended.

Thus, according to the first aspect of the present invention, there is provided a method of enhancing communication signals in a communications system (1) that uses power lines ($L_1$) as a communication pathway, wherein communication signals are subject to attenuation as they travel along the power lines over a distance, and wherein the communication signals transmitted over the power lines in a transmission direction are repeated in order to keep the communication signals from being reduced below a pre-defined level, the power lines ($L_1$) comprising a plurality of phase lines ($P_1$, $P_2$, $P_1$, $P_2$, $P_3$) disposed alongside of each other to carry alternating current electrical power in different phases relative to each other. The method comprises the steps of:

transmitting the communication signals ($S_0$) on one of said phase lines ($P_1$);

receiving the communication signals ($S_0$) from said one phase line ($P_1$) via coupling in the transmission direction where the strength of the communication signals has been reduced to a level within a pre-defined range based on the pre-defined level;

providing first signals (102) indicative of the received communication signals ($S_0$);

receiving the first signals (102) in a wireless fashion in order to provide second signals ($S_2$) on another of said phase lines ($P_2$) indicative of the received first signals, wherein the second signals ($S_2$) have a strength greater than the received communication signals ($S_0$);

receiving the second signals ($S_2$) from said another phase line ($P_2$) via coupling in the transmission direction where the strength of the second signals ($S_2$) has been reduced to a level greater than or substantially equal to the pre-defined level;

providing third signals (104) indicative of the received second signals ($S_2$);

receiving the third signals (104) in a wireless fashion in order to provide fourth signals ($S_4$) on yet another of said phase lines ($P_3$) indicative of the received third signals (104), wherein the fourth signals ($S_4$) have a strength greater than the received second signals ($S_2$);

receiving the fourth signals ($S_4$) from said yet another phase line ($P_3$) via coupling in the transmission direction where the strength of the fourth signals ($S_4$) has been reduced to a level greater than or substantially equal to the pre-defined level;

providing fifth signals (106) indicative of the received fourth signals ($S_4$); and receiving the fifth signals (106) in a wireless fashion in order to provide sixth signals ($S_6$) on said one phase line ($P_1$) indicative of the received fifth signals (106), wherein the sixth signals ($S_6$) have a strength greater than the received fourth signals ($S_4$).

Alternatively, the third signals (104) are received in a wireless fashion in order to provide fourth signals ($S_6$) on said one phase lines ($P_1$) indicative of the received third signals (104), wherein the fourth signals ($S_6$) have a strength greater than the received second signals ($S_2$).

Preferably, the method further comprises the steps of:

transmitting further communication signals ($S_1$) on said one phase lines ($P_1$);

receiving the communication signals ($S_1$) from said on phase line ($P_1$) via coupling in the transmission direction where the strength of the further communication signals ($S_1$) has been reduced to a level within the pre-defined range;

providing first further signals (101) indicative of the received further communication signals ($S_1$);

receiving the first further signals (101) in a wireless fashion in order to provide second further signals ($S_3$) on said yet another line ($P_3$) indicative of the received first further signals (101), wherein the second further signals ($S_3$) have a strength greater than the received further communication signals ($S_1$);

receiving the second further signals ($S_3$) from said yet another line ($P_3$) via coupling in the transmission direction where the strength of the second further signals ($S_3$) has been reduced to a level within the pre-defined range;

providing third further signals (103) indicative of the received second further signals ($S_3$);

receiving the third further signals (103) in a wireless fashion in order to provide fourth further signals ($S_5$) on said another line ($P_2$) indicative of the received third further signal (103), wherein the fourth further signals ($S_5$) have a strength greater than the received second further signals ($S_3$);

receiving the fourth further signals ($S_5$) from said another line ($P_2$) via coupling in the transmission direction where the strength of the fourth further signals ($S_5$) has been reduced to a level within the pre-defined range;

providing fifth further signals (105) indicative of the received fourth further signals ($S_5$); and receiving the fifth further signals (105) in a wireless fashion in order to provide sixth further signals ($S_7$) on said phase line ($P_1$) indicative of the received fifth further signals (105).

Advantageously, when the communications system further comprises at least one non-power conductor (N) alongside the power lines ($L_1$), the communication signals $S_0$ can be transmitted on the non-power conductor (N) instead of said one phase line ($P_1$) so that the communication signals ($S_0$) are received via coupling in the transmission direction from said non-power conductor (N) instead of said one phase line ($P_1$).

Alternatively, the second signals ($S_2$) can be provided on the non-power conductor (N) instead of said another phase line ($P_2$) so that the second signals ($S_2$) are received via coupling in the transmission direction from said non-power conductor (N) instead of said another phase line ($P_2$).

Alternatively, the fourth signals ($S_4$) can be provided on the non-power conductor (N) instead of said yet another phase line ($P_3$) so that the fourth signals ($S_4$) are received via coupling in the transmission direction from said non-power conductor instead of said yet another phase line ($P_3$).

According to the second aspect of the present invention, there is provided a communications system (1) that uses power lines ($L_1$) as a communication pathway to transmit communication signals, wherein communication signals are subject to attenuation as they traverse the power lines over a distance, and wherein the communication signals transmitted over the power lines in a transmission direction are repeated in order to keep the communication signals from being reduced below a pre-defined level, the power lines ($L_1$) comprising a plurality of phase lines ($P_1$, $P_2$, $P_3$) disposed alongside of each other to carry the electrical power in different phases of an alternate current cycle. The system comprises:

a first coupler (12) for providing the communication signals ($S_0$) on one of said phase lines ($P_1$);

a first transceiver (71) for receiving the communication signals ($S_0$) from said one phase line ($P_1$) via coupling in the transmission direction where the strength of the communication signals has been reduced to a level greater than or substantially equal to the pre-defined level, so as to provide first signals (102) indicative of the received communication signals ($S_0$);

a second transceiver (72) for receiving the first signals (102) in a wireless fashion in order to provide second signals ($S_2$) on another of said phase lines ($P_2$) indicative of the received first signals, wherein the second signals ($S_2$) have a strength greater than the received communication signals ($S_0$);

a third transceiver (73) for receiving the second signals ($S_2$) from said another phase line ($P_2$) via coupling in the transmission direction where the strength of the second signals has been reduced to a level within a pre-defined range, so as to provide third signals (104) indicative of the received second signals ($S_2$);

a fourth transceiver (74) for receiving the third signals (104) in a wireless fashion in order to provide fourth signals ($S_4$) on yet another of said lines ($P_3$) indicative of the received third signals (104), wherein the fourth signals ($S_4$) have a strength greater than the received second signals ($S_2$);

a fifth transceiver (75) for receiving the fourth signals ($S_4$) from said another phase line ($P_3$) via coupling in the transmission direction where the strength of the fourth signals ($S_4$) has been reduced to a level greater than or substantially equal to the pre-defined level, so as to provide fifth signals (106) indicative of the received second signals; and a sixth transceiver (76) for receiving the fifth signals (106) in a wireless fashion in order to provide sixth signals ($S_6$) on said one phase line ($P_1$) indicative of the received fifth signals (106), wherein the sixth signals ($S_6$) have a strength greater than the received fourth signals ($S_4$).

Alternatively, the fourth transceiver (76) for receiving the third signals (104) provides the fourth signals ($S_6$) on said one phase lines ($P_1$) indicative of the received third signals (104), wherein the fourth signals ($S_6$) have a strength greater than the received second signals ($S_2$);

the second transceiver (72) is disposed forward of the first transceiver (71) by a distance in the transmission direction; and the fourth transceiver (76) is disposed forward of the third transceiver (73) by a distance in the transmission direction, such that the strength of the communication signals ($S_0$) as attenuated in said one phase line ($P_1$) is negligible compared to the strength of the fourth signals ($S_6$).

Preferably, the power lines ($L_1$) are also used to transmit further communication signals ($S_1$). The system further comprises:

a second coupler (52) for providing the further communication signals ($S_1$) on said one phase line ($P_1$), wherein the sixth transceiver (76) is adapted to receive the further communication signals ($S_1$) via coupling in the transmission direction so as to provide first further signals (101) indicative of the further communication signals ($S_1$);

the fifth transceiver (75) is adapted to receive the first further signals (101) in a wireless fashion in order to provide second further signals ($S_3$) indicative of the received first further signals (101);

the fourth transceiver (74) is adapted to receive the second further signals ($S_3$) via coupling so as to provide third further signals (103) indicative of the received second further signals ($S_3$);

the third transceiver (73) is adapted to receive the third further signals (103) in a wireless fashion in order to provide fourth further signals ($S_5$) indicative of the received third further signals (103), wherein the fourth further signals ($S_5$) have a strength greater than the received third further signals (103);

the second transceiver (72) is adapted to receive the fourth further signals ($S_5$) via coupling so as to provide fifth further signals (105) indicative of the received fourth further signals ($S_5$); and the first transceiver (71) is adapted to receive the fifth further signals (105) in a wireless fashion in order to provide sixth further signals ($S_7$), wherein the sixth further signals ($S_7$) have a strength greater than the received fourth further signals ($S_5$).

The communications signals ($S_0$) are transmitted in a first radio frequency range and the further communication signals ($S_1$) are transmitted in a different second frequency range.

BEST MODE TO CARRY OUT THE INVENTION

Figure 3:
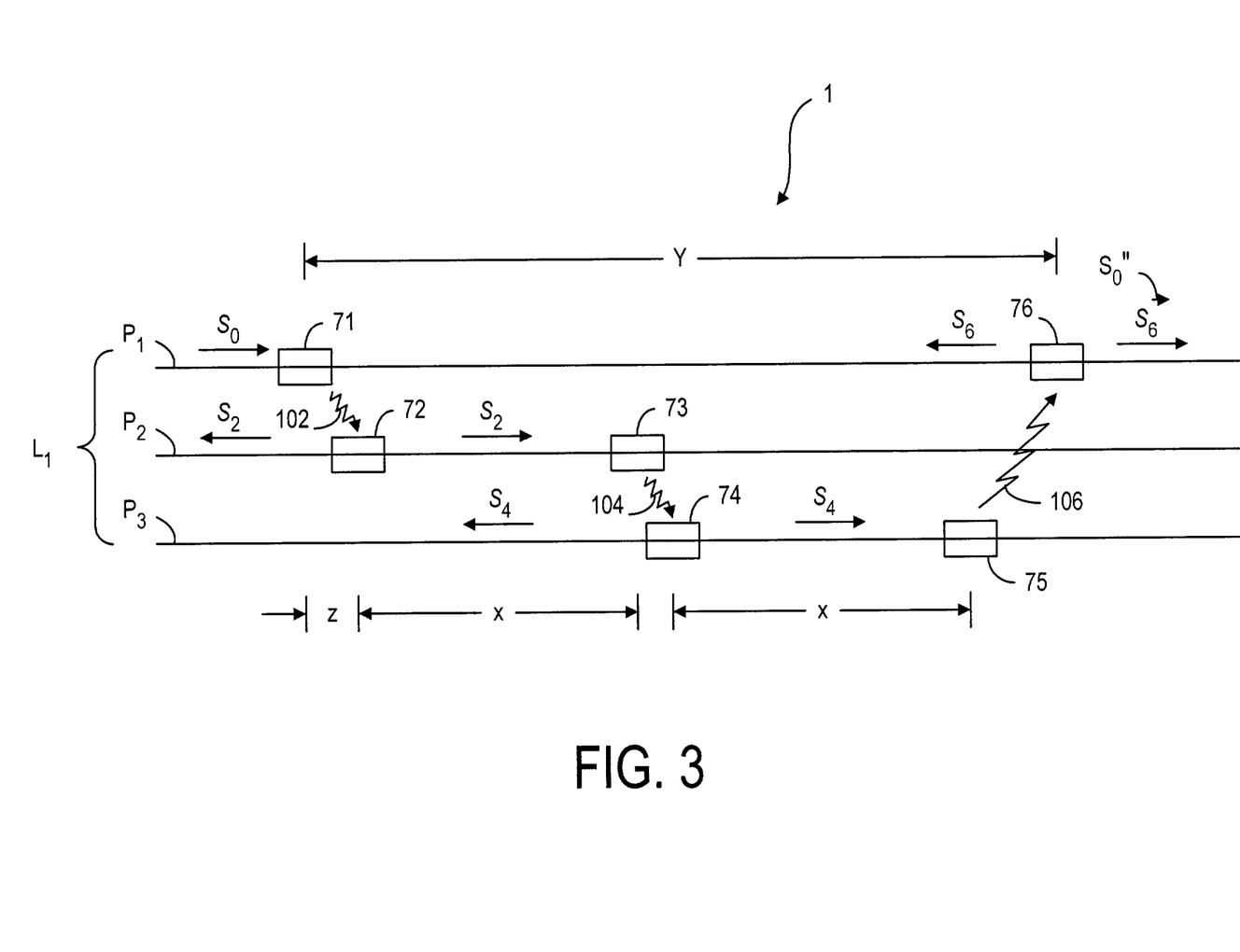
FIG. 3 is a schematic representation showing a plurality of repeaters being used in a power line communications network, according to the present invention.

In high-voltage or medium-voltage power distribution, power is typically supplied in three phases. Thus, three phase lines are used together to deliver high-voltage or medium-voltage power from one point to another. Furthermore, these phase lines are physically separated and electrically shielded from each other. It is advantageous and desirable to use all three phase lines to send the RF signals in a power-line communications (PLC) network. In the PLC network 1, as shown in FIG. 3, the power-line $L_1$ comprises three separate phase lines $P_1$, $P_2$ and $P_3$. It is possible to distribute a plurality of repeaters 71, 72, . . . on three phase lines $P_1$, $P_2$ and $P_3$ for repeating the communication data contained in signal $S_0$. For example, repeater 71 is implemented on $P_1$ to receive signal $S_0$. Through a wireless link 102, repeater 72 receives signals indicative of $S_0$ from repeater 71. Based on the received signals, repeater 72 transmits RF signal $S_2$ over the phase line $P_2$. At a distance X from repeater 72, repeater 73 sends signals indicative of $S_2$ to repeater 74 via a wireless link 104. Likewise, repeater 74 transmits RF signal $S_4$ over the phase line $P_3$. At a distance X from repeater 74, repeater 75 sends signals indicative of $S_4$ to repeater 76 via a wireless link 106. Repeater 76 transmits RF signal $S_6$ over the phase line $P_1$.

Figure 4:
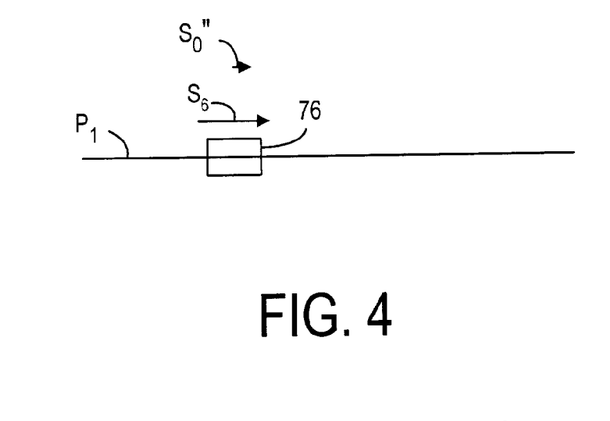
FIG. 4 is a schematic representation showing the RF signals received by one of the repeaters.

Using this phase line hopping approach, the distance between two adjacent repeaters on any phase line is Y, which is substantially equal to or greater than 2X. Thus, although repeater 76 also receives RF signal $S_0$ in the upstream direction, signal $S_0$ will be significantly attenuated when it reaches repeater 76, as denoted by $S_0"$ in FIG. 4. Thus, interference by signal $S_0"$ on signal $S_6$ transmitted by repeater 76 is greatly reduced. Likewise, although repeater 76 also transmits RF signal $S_6$ in both the upstream and downstream directions, signal $S_6$ will be significantly attenuated when it reaches repeater 71. Thus, the interference by signal $S_6$ on signal $S_0$, after signal $S_6$ is attenuated over the distance Y and received by repeater 71, is greatly reduced.

Figure 5A:
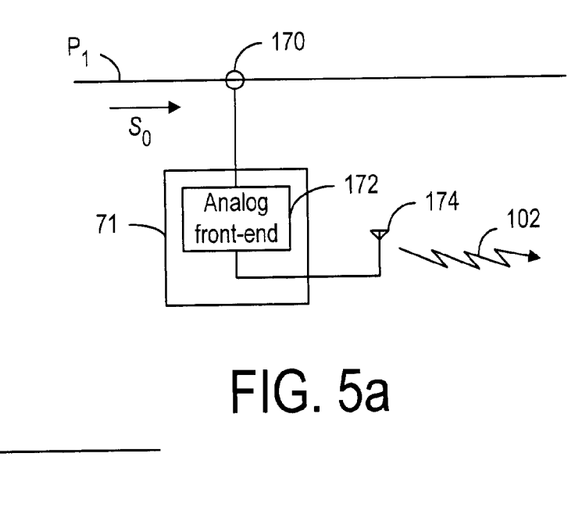
FIG. 5a is a schematic representation showing a transceiver for use in RF signal repeating, according to the present invention.
Figure 5B:
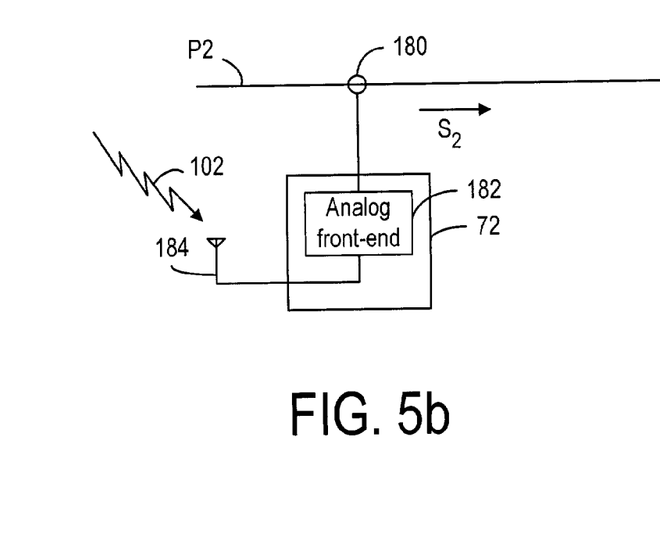
FIG. 5b is a schematic representation showing another transceiver for use in RF signal repeating, according to the present invention.

It should be noted that each of repeaters 71, 73 and 75 comprises an RF coupler in order to receive RF signals broadcast on a power line. Similarly, each of repeaters 72, 74 and 76 comprises an RF coupler in order to induce RF signals to the power line. As shown in FIG. 5a, repeater 71 comprises an RF coupler 170 to receive RF signal $S_0$ from the phase line $P_1$. The RF coupler 170 is operatively connected to an analog front-end 172, which filters and processes the received signals. Repeater 71 also has an RF antenna 174, operatively connected to the analog front end 172, for transmitting signals 102 indicative of signals $S_0$. As shown in FIG. 5b, repeater 72 has an RF antenna 184 to receive signals 102 in a wireless fashion. The RF antenna 184 is connected to an analog front-end 182, which filters and processes the received signals. Repeater 72 also comprises an RF coupler 180, operatively connected to the analog front-end 182, to transmit RF signals $S_2$ on the phase line $P_2$, indicative of the received signals 102.

Figure 6:
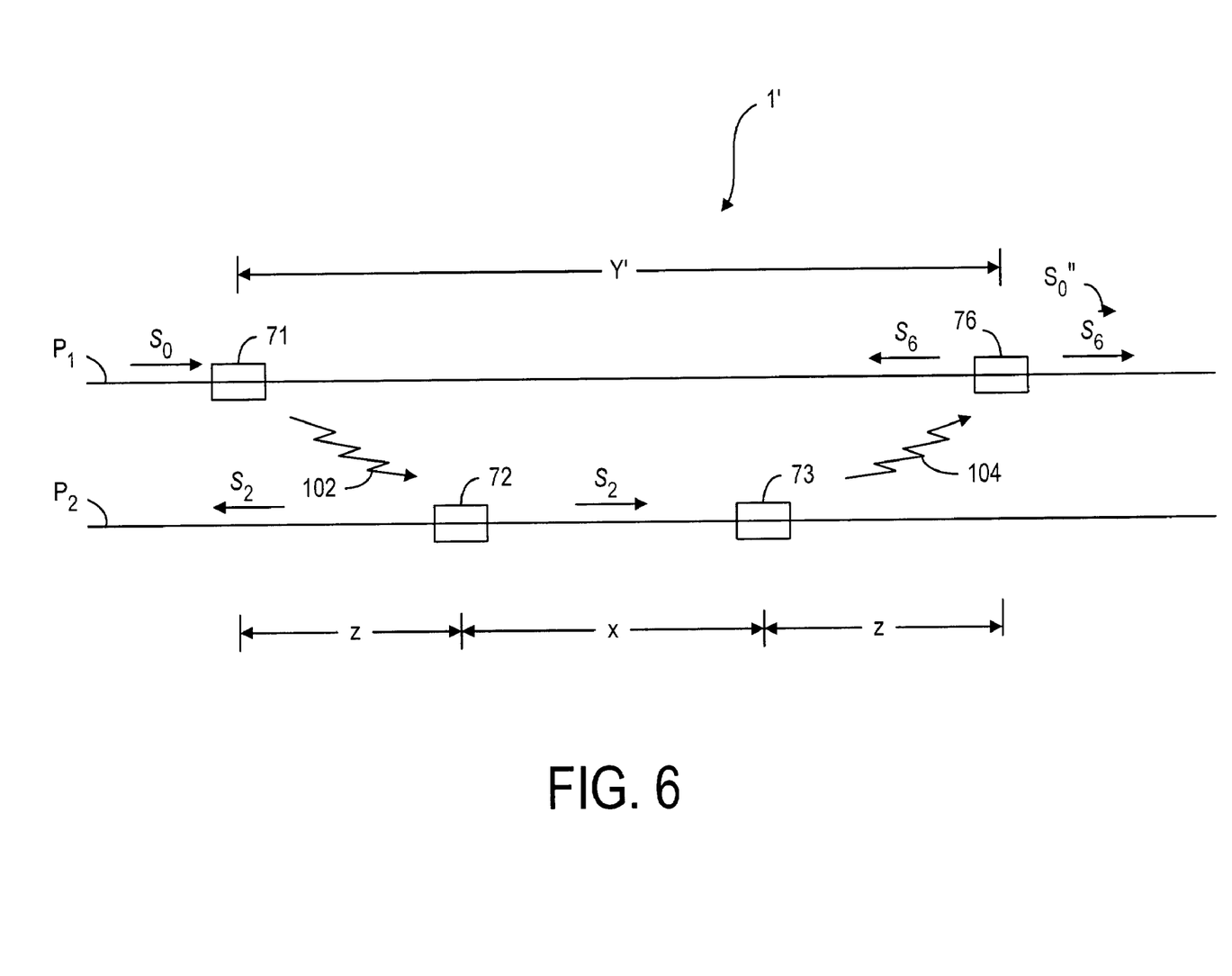
FIG. 6 is a schematic representation showing signal repeating being carried out on two phase lines.

As shown in FIG. 3, repeaters 71 and 72 are separated by a distance Z. It is possible to use directional wireless radio antennas to extend the distance Z in order to increase the distance Y. As such, the RF signal $S_6'$, as received by repeater 71 (FIG. 4), is further attenuated. If the distance Z is sufficiently large, it is possible to carry out the phase-line hopping approach, according to the present invention, on only two phase lines. As shown in FIG. 6, repeaters 71, 72, 73 and 76 are implemented on two phase lines $P_1$ and $P_2$ for signal repeating. As shown, the distance between repeater 71 and repeater 76 is Y'=X+2Z. The additional length 2Z is such that the additional attenuation on the RF signal $S_6$ significantly reduces the interference by this upstream RF signal on $S_0$ at repeater 71.

Figure 7:
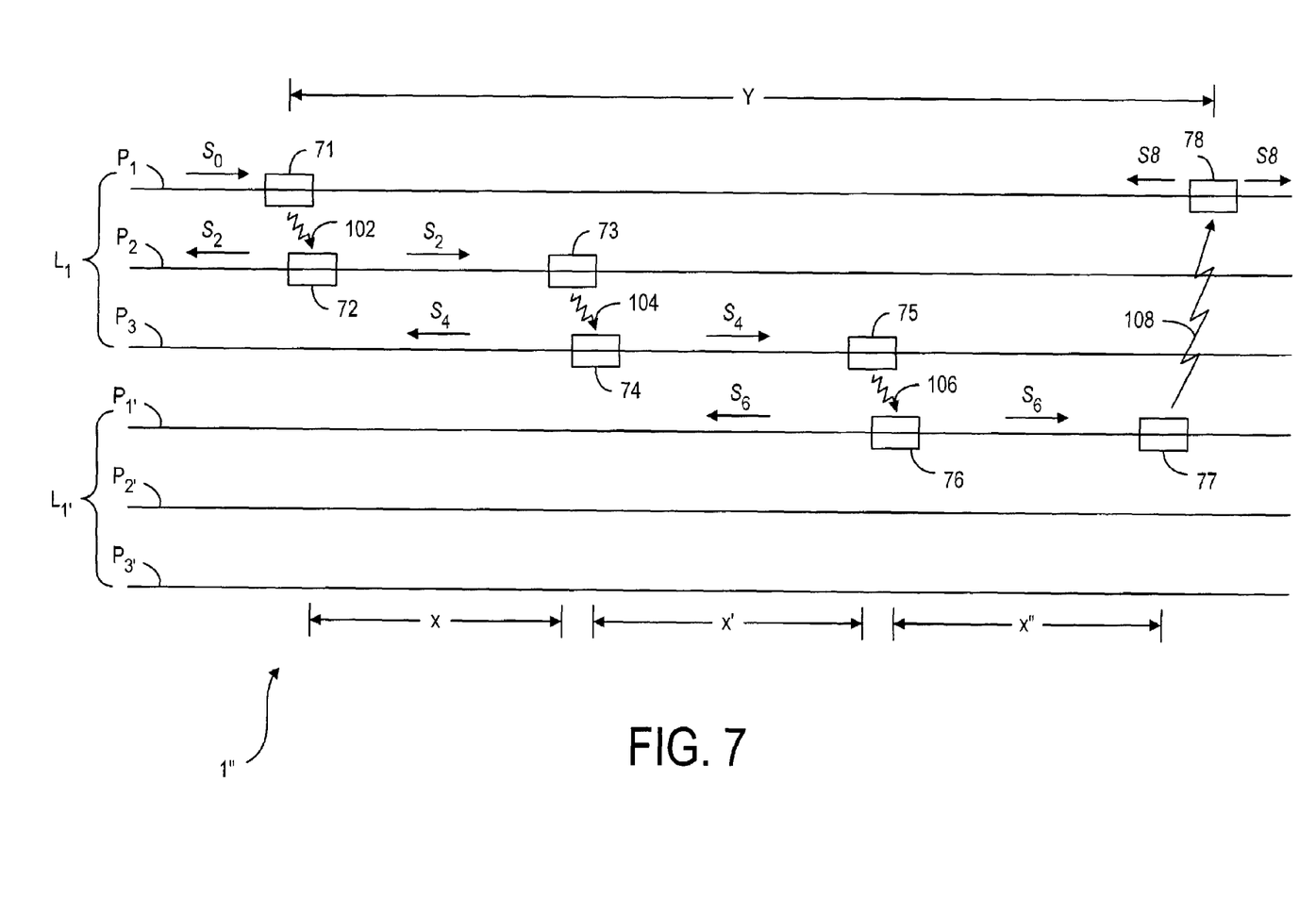
FIG. 7 is a schematic representation showing a plurality of repeaters being used in a power line communications network having four or more phase lines, according to the present invention.

In FIG. 3, the separation between two adjacent repeaters on any phase line without phase-line hopping is X. X is defined as the distance over which the communication signals travel until they are significantly attenuated and yet still usable. However, for practical reasons, this separation should be within a range that is slightly smaller or greater than X. Furthermore, the separation between two adjacent repeaters on one phase line is not necessarily the same as that on another phase line, as illustrated in FIG. 7.

In FIGS. 5a and 5b, it is assumed that the signals conveyed in a wireless fashion between different phase lines $P_1$ and $P_2$ are RF signals. If it is desirable to convey signals 102 optically, then the antenna 174 and the antenna 184 must be replaced by optical transceivers. Moreover, if the phase line $P_1$ is electrically shielded, it is required to strip off the shield where the RF coupler 170 is coupled to the phase line so that the RF signal $S_0$ can be effectively received by repeater 71.

It should be further noted that the present invention is better implemented where the multi-phase lines ($P_1$, $P_2$, $P_3$) are electrically shielded, such as used in underground MV power distribution. For overhead MV power distribution where the phase lines are not electrically shielded, the separation between the phase lines may be insufficient to significantly prevent wireless inducement of the communication signals from one phase line to another, thereby rendering the phase-line hopping technique of marginal effect.

In some cases, power lines are routed on the same poles for some distance as two or more three-phase circuits. Thus, there are more than three phase lines available. For example, there may be six phase lines or nine phase lines available for phase-line hopping. In FIG. 7, the PLC network 1' may have two or more three-phase circuits, as denoted by power line $L_1$ and power line $L_1'$. The power line $L_1$ comprises three separate phase lines $P_1$, $P_2$ and $P_3$, and the power line $L_1'$ comprises three separate phase lines $P_1'$, $P_2'$ and $P_3'$. In that case, the phase-line hopping approach, according to the present invention, can be implemented on more than three phase lines. For example, repeaters 71, 72, ..., 78, ... can be implemented on four phase lines $P_1$, $P_2$, $P_3$ and $P_1'$ to repeat communication data contained in signal $S_0$. As shown, repeater 71 is implemented on $P_1$ to receive $S_0$. Through a wireless link 102, repeater 72 receives signals indicative of $S_0$ from repeater 71. Based on the received signals, repeater 72 transmitts RF signal $S_2$ over the phase line $P_2$ and signal $S_2$ is received by repeater 73 at a distance X from repeater 72. In a similar fashion, repeater 75 receives signal $S_4$ from repeater 74, and repeater 77 receives signal $S_6$ from repeater 76. As shown in FIG. 7, repeater 78 receives signals indicative of $S_6$ through a wireless link 108. Using this phase-line hopping approach, the distance between two adjacent repeaters on any phase line is Y, which is substantially equal to or greater than X+X'+X". Here X, X' and X" are substantially within the range of distance over which the communication signals travel until they are significantly attenuated and yet still usable. X, X' and X" can be substantially equal to or different from each other.

So long as the separation between phase lines is within the range of the wireless communication, such as in the links 102, ..., 108, the phase-line hopping approach, according to the present invention, can also be implemented on five or more phase lines.

Figure 8:
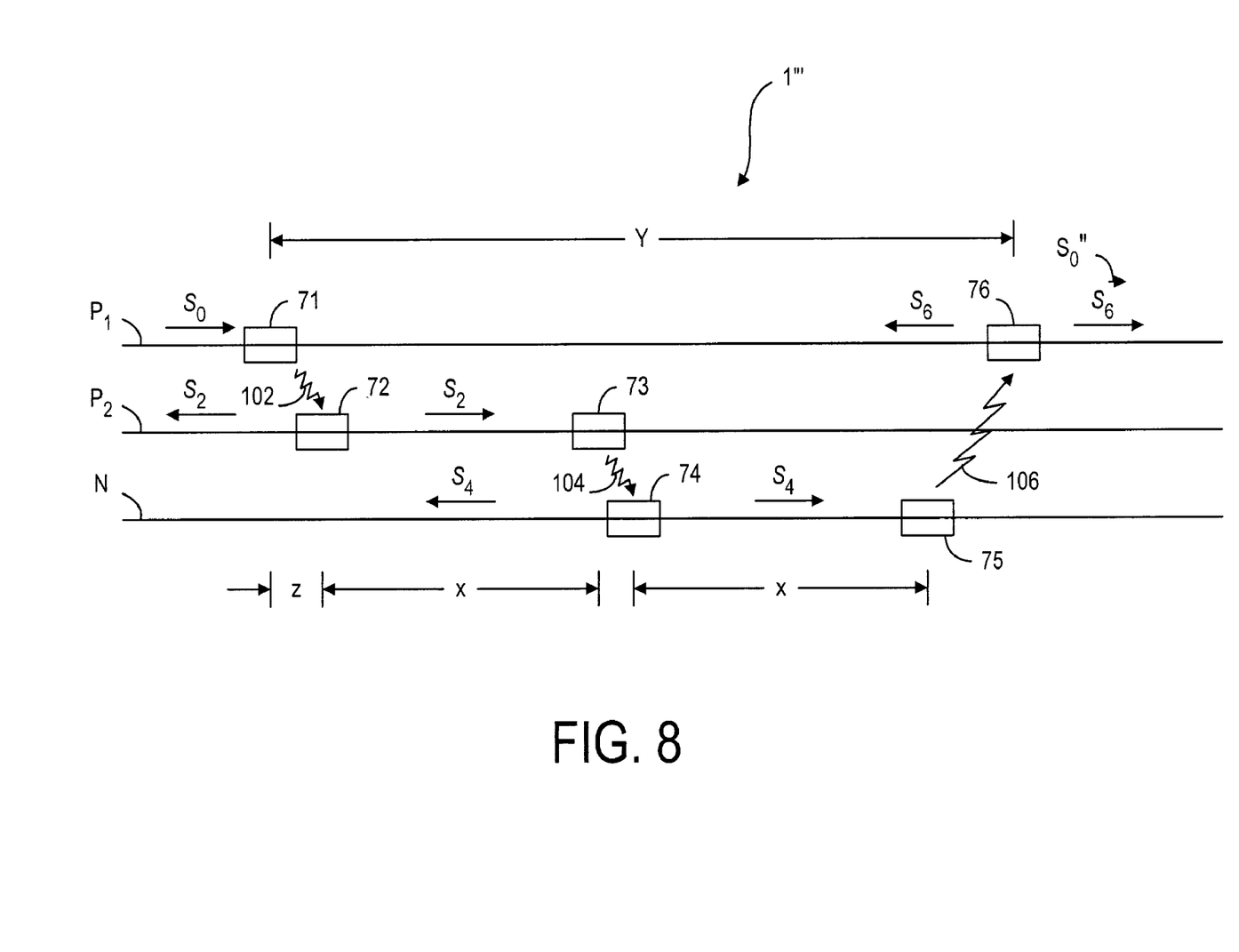
FIG. 8 is a schematic representation showing a plurality of repeaters being used in a power line communications network having one or more non-power conductors, according to the present invention.

In some cases where one or two non-power conductors are routed on the poles along with the phase lines for some distance, these non-power conductors can also be used for phase-line hopping purposes. For example, a non-power conductor N is used, instead of the phase line $P_3$ of FIG. 3, for phase-line hopping, as shown in FIG. 8. Likewise, the non-power conductor N can be used instead of any phase line ($P_1$, $P_2$, $P_1'$, $P_2'$, $P_3'$) of FIGS. 3, 6 and 7.

Figure 9:
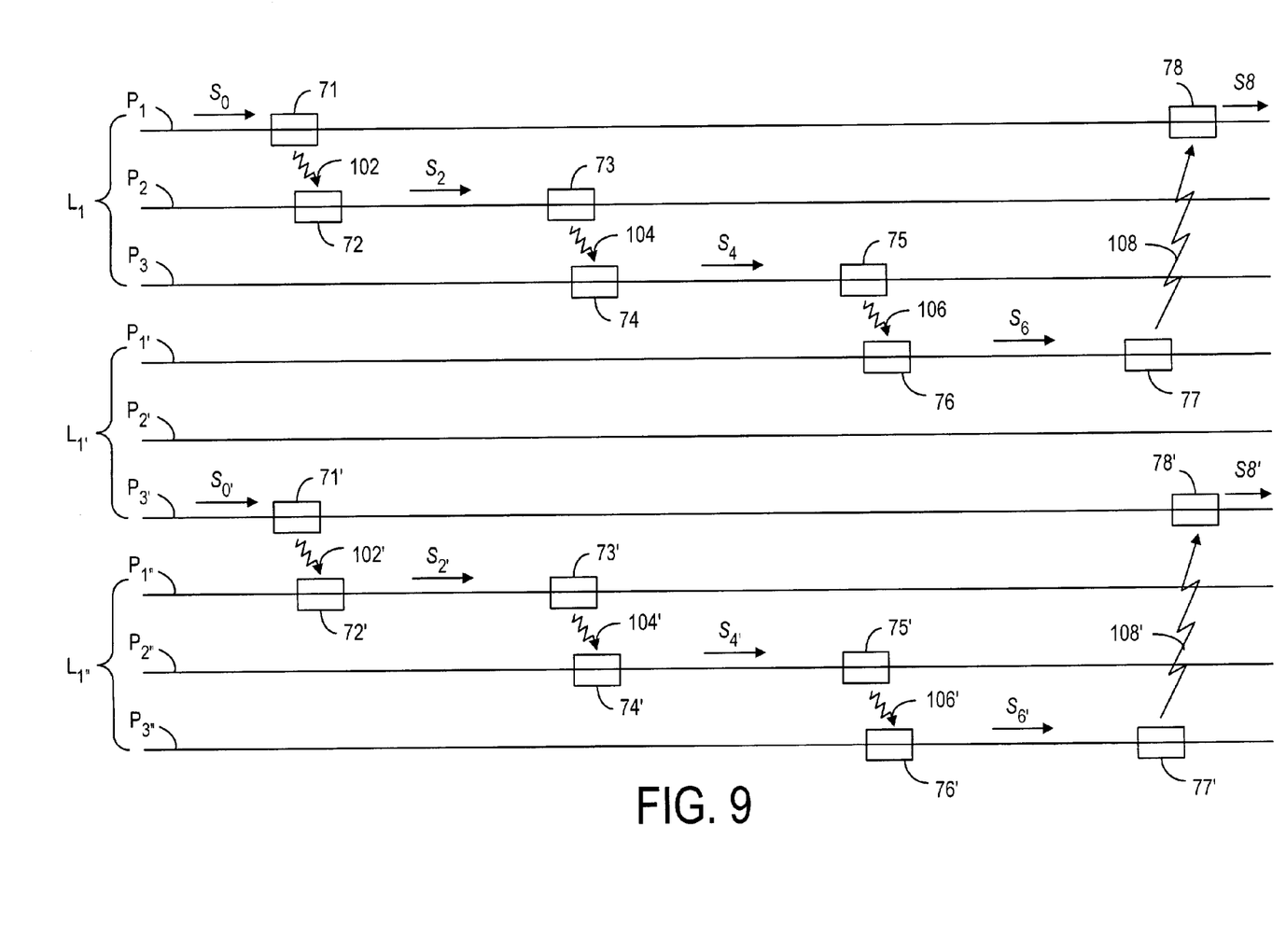
FIG. 9 is schematic representation showing a plurality of phase lines being divided into two or more groups for independent use in phase hopping, according to the present invention.

When a sufficiently large number of conductors, including phase lines and non-power conductors, are available over a certain distance along a row, more than one information stream can be simultaneously conveyed over the conductors along the same direction. As shown in FIG. 9, nine conductors ($P_1$, $P_2$, $P_3$, $P_1'$, ..., $P_2''$, $P_3''$) are used to route three three-phase circuits ($L_1$, $L_1'$, $L_1''$) on the same poles. It is possible to implement on those conductors two independent sets of repeaters (71, 72, ..., 77, 78), (71', 72', ..., 77', 78') for phase hopping purposes. As such, one information stream can be sent over one set of repeaters (71, 72, ..., 77, 78) and another information stream can be sent over the other set of repeaters (71', 72', ..., 77', 78'), so long as there is no significant interference between the two sets of repeaters. For example, it is possible to use one optical frequency to send signals indicative of the signal $S_0$ via the wireless link 102 and a different optical frequency to send signals indicative of the signal $S_0'$ via the wireless link 102', so that the signal $S_0$ does not interfere with the signal $S_2'$ relayed by the repeater 72'. In that case, the signal $S_0$ and the signal $S_0'$ can use the same RF frequency. Alternatively, the signal $S_0$ and the signal $S_0'$ can use different RF frequencies.

As shown in FIG. 9, two sets of repeaters are used to send two independent information streams along the same direction. Each stream uses four phase lines. However, it is also possible to use four phase lines to send one information stream and five different phase lines to send the other information stream. Likewise, it is possible to implement three independent sets of repeaters for sending three information streams over nine conductors along the same direction, so long as there is no significant interference among these three sets of repeaters.

Figure 10:
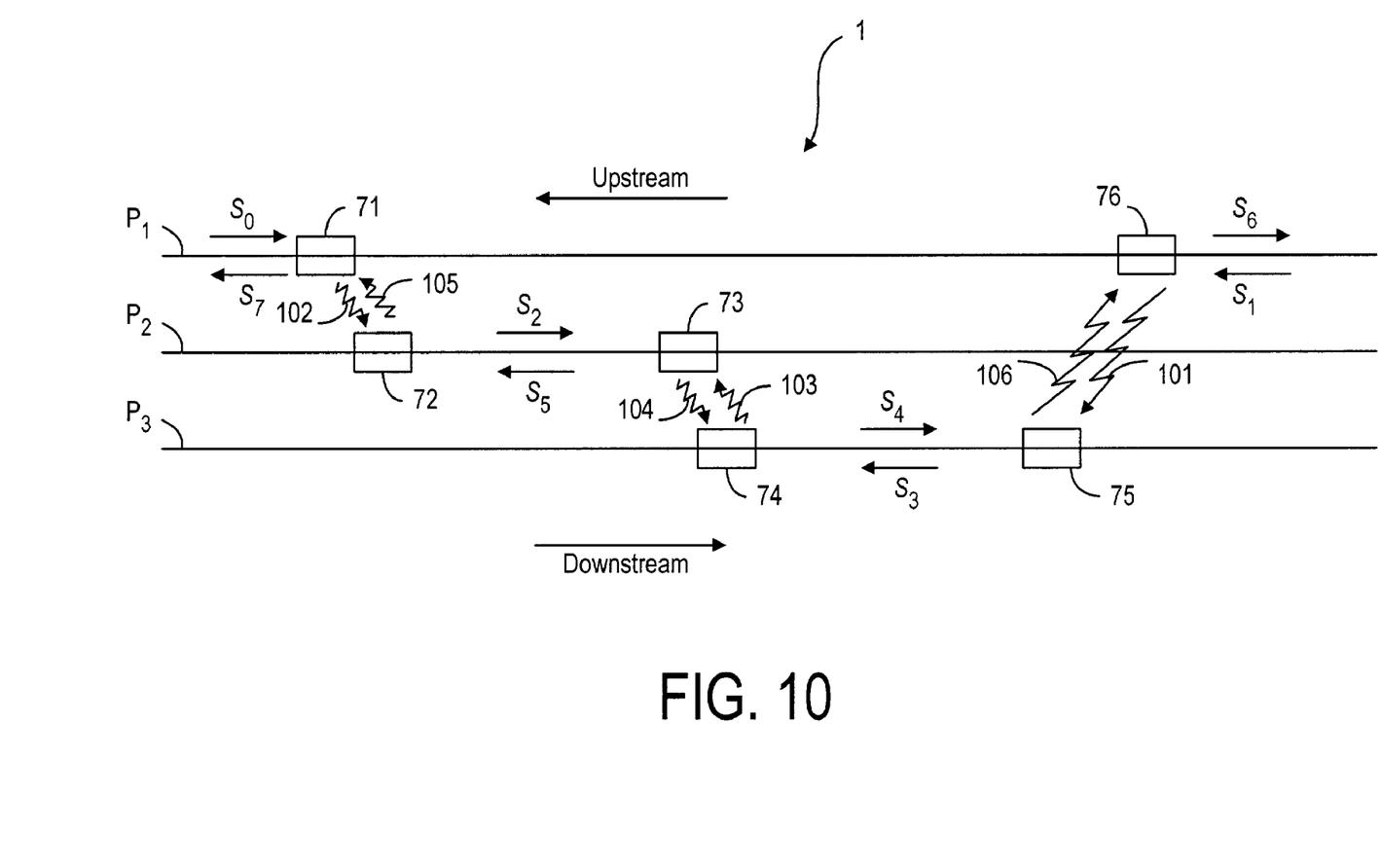
FIG. 10 is a schematic representation showing a plurality of repeaters being used in a two-way communications network, according to the present invention.

As shown in FIGS. 3, 6–9, each set of repeaters is shown as being used to send an information stream along one direction. In practice, it is preferable that each set of repeaters be used for two-way communications. As shown in FIG. 10, the repeaters 71, 72, ..., 75, 76 are used to convey the signals $S_0$, $S_2$, $S_4$, $S_6$, indicative of one information stream, via wireless links 102, 104, 106, to the downstream end. The same repeaters can also be used to convey signals $S_1$, $S_3$, $S_5$, $S_7$, indicative of another information stream, via wireless links 101, 103, 105, 107, to the upstream end. For example, the repeater 72 receives wireless signal 102, indicative of RF signal $S_0$, from the repeater 71 and transmits RF signal $S_2$ to the repeater 73. In addition, the repeater 72 is adapted to receive RF signal $S_5$ from the repeater 73 and to transmit wireless signal 105, indicative of RF signal $S_5$, to the repeater 71. In general, the RF frequency for the upstream signals is slightly different from the RF frequency for the downstream signals. Accordingly, the RF coupler 180 of the repeater 72 (FIG. 5b) is also capable of receiving RF signals and the antenna 104 is also capable of transmitting wireless signals. Alternatively, the repeater 72 comprises an additional RF coupler for receiving RF signals and an additional antenna for transmitting wireless signals.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of enhancing communication signals in a communications system (1) tat uses power lines ($L_1$) as a communication pathway, wherein communication signals are subject to attenuation as they travel along the power lines over a distance, and wherein the communication signals transmitted over the power lines in a transmission direction are repeated in order to keep the communication signals from being reduced below a pre-defined level, the power lines ($L_1$) comprising a plurality of phase lines ($P_1$, $P_2$, $P_1$, $P_2$, $P_3$) disposed alongside of each other to carry alternating current electrical power in different phases relative to each other, said method comprising the steps of:
   transmitting the communication signals ($S_0$) on a first phase line ($P_1$);
   receiving the communication signals ($S_0$) from the first phase line ($P_1$) via coupling in the transmission direction;
   providing first signals (102) indicative of the received communication signals ($S_0$); and
   receiving the first signals (102) in a wireless fashion in order to provide second signals ($S_2$) on a second phase line ($P_2$), the second signals indicative of the received first signals, thereby repeating the communication signals on the second phase line, wherein the second signals ($S_2$) have a strength greater than the received communication signals ($S_0$).

2. The method of claim 1, further comprising the steps of:
   receiving the second signals ($S_2$) from the second phase line ($P_2$) via coupling in the transmission direction where the strength of the second signals ($S_2$) has been reduced to a level greater than or substantially equal to the pre-defined level;
   providing third signals (104) indicative of the received second signals ($S_2$); and
   receiving the third signals (104) in a wireless fashion in order to provide fourth signals ($S_4$) on a third phase line ($P_3$), the fourth signals indicative of the received third signals (104), thereby repeating the communication signals on the third phase line, wherein the fourth signals ($S_4$) hive a strength greater than the received second signals ($S_2$).

3. The method of claim 2, further comprising the steps of:
   receiving the fourth signals ($S_4$) from the third phase line ($P_3$) via coupling in the transmission direction where the strength of the fourth signals ($S_4$) has been reduced to a level greater than or substantially equal to the pre-defined level;
   providing fifth signals (106) indicative of the received fourth signals ($S_4$); and
   receiving the fifth signals (106) in a wireless fashion in order to provide sixth signals ($S_6$) on the first phase line ($P_1$), the sixth signals indicative of the received fifth signals (106), wherein the sixth signals ($S_6$) have a strength greater than the received fourth signals ($S_4$).

4. The method of claim 1, further comprising the steps of:
   receiving the second signals ($S_2$) from the second phase line ($P_2$) via coupling in the transmission direction where the strength of the second signals ($S_2$) has been reduced to a level greater than or substantially equal to the pre-defined level;
   providing third signals (104) indicative of the received second signals ($S_2$); and
   receiving the third signals (104) in a wireless fashion in order to provide fourth signals ($S_6$) on the first phase lines ($P_1$), the fourth signals indicative of the received third signals (104), wherein the fourth signals ($S_6$) have a strength greater than the received second signals ($S_2$).

5. The method of claim 2, wherein the communications system further comprises at least one non-power conductor (N) alongside the power lines ($L_1$), and wherein
   the communication signals $S_0$ are transmitted on the non-power conductor (N) instead of the first phase line ($P_1$) so that the communication signals $S_0$ are received via coupling in the transmission direction from said non-power conductor (N) instead of the first phase line ($P_1$).

6. The method of claim 2, wherein the communications system further comprises at least one non-power conductor (N) alongside the power lines ($L_1$), and wherein
   the second signals ($S_2$) are provided on the non-power conductor (N) instead of the second phase line ($P_2$) so that the second signals ($S_2$) are received via coupling in the transmission direction from said non-power conductor (N) instead of the second phase line ($P_2$).

7. The method of claim 3, wherein the communications system further comprises at least one non-power conductor (N) alongside the power lines ($L_1$), and wherein
   the fourth signals ($S_4$) are provided on the non-power conductor (N) instead of the third phase line ($P_3$) so that the fourth signals ($S_4$) are received via coupling in the transmission direction from said non-power conductor instead of the third phase line ($P_3$).

8. The method of claim 2, wherein the communications system further comprises a plurality of further phase lines $P_1'$, $P_2'$, $P_3'$) alongside the power lines ($L_1$), said method further comprising the steps of:
   receiving the fourth signals ($S_4$) from the third phase line ($P_3$) via coupling in the transmission direction where the strength of the fourth signals ($S_4$) has been reduced to a level greater than or substantially equal to the pre-defined level;

providing fifth signals (106) indicative of the received fourth signals ($S_4$); receiving the fifth signals (106) in a wireless fashion in order to provide sixth signals ($S_6$) on a first further phase line ($P_1'$), the sixth signals indicative of the received fifth signals (106), wherein the sixth signals ($S_6$) have a strength greater than the received fourth signals ($S_4$);

receiving the sixth signals ($S_6$) from the first further phase line ($P_1'$) via coupling in the transmission direction where the strength of the sixth signals ($S_6$) has been reduced to a level greater than or substantially equal to the pre-defined level;

providing seventh signals (108) indicative of the received sixth signals ($S_6$); and receiving the seventh signals (108) in a wireless fashion in order to provide eighth signals ($S_8$) on the first phase line ($P_1$), the eighth signals indicative of the received seventh signals (108), wherein the eighth signals ($S_8$) have a strength greater than the received sixth signals ($S_6$).

9. The method of claim 3, further comprising the steps of:

transmitting further communication signals ($S_1$) on the first phase line ($P_1$);

receiving the further communication signals ($S_1$) from the first phase line ($P_1$) via coupling in the transmission direction;

providing first further signals (101) indicative of the received further communication signals ($S_1$);

receiving the first further signals (101) in a wireless fashion in order to provide second further signals ($S_3$) on the third phase line ($P_3$), the second signals indicative of the received first further signals (101), wherein the second further signals ($S_3$) have a strength greater than the received further communication signals ($S_1$);

receiving the second further signals ($S_3$) from the third line ($P_3$) via coupling in the transmission direction where the strength of the second further signals ($S_3$) has been reduced to a level within the pre-defined range;

providing third further signals (103) indicative of the received second further signals ($S_3$);

receiving the third further signals (103) in a wireless fashion in order to provide fourth further signals ($S_5$) on the second phase line ($P_2$), the fourth further signals indicative of the received third further signal (103), wherein the fourth further signals ($S_5$) have a strength greater than the received second further signals ($S_3$);

receiving the fourth further signals ($S_5$) from the second phase line ($P_2$) via coupling in the transmission direction where the strength of the fourth further signals ($S_5$) has been reduced to a level within the pre-defined range;

providing fifth further signals (105) indicative of the received fourth further signals ($S_5$); and receiving the fifth further signals (105) in a wireless fashion in order to provide sixth further signals ($S_7$) on the first phase line ($P_1$), the sixth further signals indicative of the received fifth further signals (105).

10. The method of claim 1, wherein the communication signals ($S_0$) are received from the first phase line ($P_1$) at a location where the strength of the communication signals ($S_0$) has been reduced to a level within a pre-defined range based on the pre-defined level.

11. The method of claim 9, wherein the further communication signals ($S_1$) are received from the first phase line ($P_1$) at a location where the strength of the further communication signals ($S_1$) has been reduced to a level within a pre-defined range based on the pre-defined level.

12. A communications system (1) that uses power lines ($L_1$) as a communication pathway to transmit communication signals, wherein communication signals are subject to attenuation as they traverse the power lines over a distance, and wherein the communication signals transmitted over the power lines in a transmission direction are repeated in order to keep the communication signals from being reduced below a pre-defined level, the power lines ($L_1$) comprising a plurality of phase-lines ($P_1$, $P_2$, $P_3$) disposed alongside of each other to carry the electrical power in different phases of an alternate current cycle, said system comprising:

a first coupler (12) for providing the communication signals ($S_0$) on a first phase line ($P_1$);

a first transceiver (71) for receiving the communication signals ($S_0$) from the first phase line ($P_1$) via coupling in the transmission direction, so as to provide first signals (102) indicative of the received communication signals ($S_0$); and a second transceiver (72) for receiving the first signals (102) in a wireless fashion in order to provide second signals ($S_2$) on a second phase line ($P_2$), the second signals indicative of the received first signals, thereby repeating the communication signals on the second phase line, wherein the second signals ($S_2$) have a strength greater than the received communication signals ($S_0$).

13. The system of claim 12, further comprising:

a third transceiver (73) for receiving the second signals ($S_2$) from the second phase line ($P_2$) via coupling in the transmission direction where the strength of the second signals has been reduced to a level within the pro-defined range, so as to provide third signals (104) indicative of the received second signals ($S_2$); and a fourth transceiver (74) for receiving the third signals (104) in a wireless fashion in order to provide fourth signals ($S_4$) on a third phase line ($P_3$), the fourth signals indicative of the received third signals (104), thereby repeating the communication signal on the third phase line, wherein the fourth signals ($S_4$) have a strength greater than the received second signals ($S_2$).

14. The system of claim 13, further comprising:

a fifth transceiver (75) for receiving the fourth signals ($S_4$) from the third phase-line ($P_3$) via coupling in the transmission direction where the strength of the fourth signals ($S_4$) has been reduced to a level greater than or substantially equal to the pre-defined level, so as to provide fifth signals (106) indicative of the received second signals; and a sixth transceiver (76) for receiving the fifth signals (106) in a wireless fashion in order to provide sixth signals ($S_6$) on the first phase line ($P_1$) the sixth signals indicative of the received fifth signals (106), wherein the sixth signals ($S_6$) have a strength greater than the received fourth signals ($S_4$).

15. The system of claim 12, further comprising:

a third transceiver (73) for receiving the second signals ($S_2$) from the second phase line ($P_2$) via coupling in the transmission direction where the strength of the second signals ($S_2$) has been reduced to a level greater than or substantially equal to the pre-defined level, so as to provide third signals (104) indicative of the received second signals ($S_2$); and a fourth transceiver (76) for receiving the third signals (104) in a wireless fashion in order to provide fourth signals ($S_6$) on the first phase line ($P_1$), the fourth signals indicative of the received third signals (104), wherein the fourth signals ($S_6$) have a strength greater than the received second signals ($S_2$), and wherein the second transceiver (72) is disposed forward of the first transceiver (71) by a distance in the transmission direction, and the fourth transceiver (76) is disposed forward of the third transceiver (73) by a distance in the transmission direction, such that the strength of the communication signals ($S_0$) as attenuated in said one phase-line ($P_1$) is negligible compared to the strength of the fourth signals ($S_6$).

16. The system of claim 14, wherein the power lines ($L_1$) are also used to transmit further communication signals ($S_1$), said system further comprising a second coupler (52) for providing the further communication signals ($S_1$) on the first phase line ($P_1$), wherein the sixth transceiver (76) is adapted to receive the further communication signals ($S_1$) via coupling in the transmission direction so as to provide first further signals (101) indicative of the further communication signals ($S_1$);

the fifth transceiver (75) is adapted to receive the first further signals (101) in a wireless fashion in order to provide second further signals ($S_3$) indicative of the received first further signals (101);

the fourth transceiver (74) is adapted to receive the second further signals ($S_3$) via coupling so as to provide third further signals (103) indicative of the received second further signals ($S_3$);

the third transceiver (73) is adapted to receive the third further signals (103) in a wireless fashion in order to provide fourth further signals ($S_5$) indicative of the received third further signals (103), wherein the fourth further signals ($S_5$) have a strength greater than the received third further signals (103);

the second transceiver (72) is adapted to receive the fourth further signals ($S_5$) via coupling so as to provide fifth further signals (105) indicative of the received fourth further signals ($S_5$); and the fist transceiver (71) is adapted to receive the fifth further signals (105) in a wireless fashion in order to provide sixth further signals ($S_7$), wherein the sixth further signals ($S_7$) have a strength greater than the received fourth further signals ($S_5$).

17. The system of claim 16, wherein the communication signals ($S_0$) are transmitted in a first radio frequency range and the further communication signals ($S_1$) are transmitted in a different second frequency range.

18. The system of claim 16, wherein the second further signals ($S_3$) have a strength greater than the received further communication signals ($S_1$).

19. The system of claim 12, wherein the first transceiver (71) is disposed at a location where the strength of the communication signals ($S_0$) has been reduced to a level within a pre-defined range based on the pre-defined level.

* * * * *

UNITED STATES PATENT AND TRADEMARK OFFICE
CERTIFICATE OF CORRECTION

PATENT NO. : 6,993,317 B2
DATED : January 31, 2006
INVENTOR(S) : Fred Belsak

It is certified that error appears in the above-identified patent and that said Letters Patent is hereby corrected as shown below:

Column 9,
Line 42, "$P_2$," should be -- $P_2$; --.

Column 10,
Line 6, "hive" should be -- have --.
Line 61, "$P^1$," should be -- ($P^1$ --.

Column 12,
Line 31, "pro" should be -- pre --.

Column 14,
Line 11, "fist" should be -- first --.

Signed and Sealed this

Twenty-third Day of May, 2006

JON W. DUDAS
*Director of the United States Patent and Trademark Office*